US010736194B2

United States Patent
Middel et al.

(10) Patent No.: US 10,736,194 B2
(45) Date of Patent: Aug. 4, 2020

(54) CONTROLLING SYSTEM AND CONTROLLING METHOD

(71) Applicant: TRIDONIC GMBH & CO KG, Dornbirn (AT)

(72) Inventors: Tjaco Middel, Guangdong (CN); Lakes Hu, Guangdong (CN); Patrick Yang, Guangdong (CN); Amy Zhou, Guangdong (CN)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/619,957

(22) PCT Filed: Jun. 26, 2017

(86) PCT No.: PCT/CN2017/090081
§ 371 (c)(1),
(2) Date: Dec. 6, 2019

(87) PCT Pub. No.: WO2019/000184
PCT Pub. Date: Jan. 3, 2019

(65) Prior Publication Data
US 2020/0137852 A1    Apr. 30, 2020

(51) Int. Cl.
*H05B 45/37*      (2020.01)
*H05B 45/305*     (2020.01)
*H05B 45/3725*    (2020.01)

(52) U.S. Cl.
CPC ....... *H05B 45/305* (2020.01); *H05B 45/3725* (2020.01)

(58) Field of Classification Search
CPC ........ H05B 45/37; H05B 45/10; H05B 45/46; H05B 47/10; H05B 47/17; H05B 47/185;
(Continued)

(56) References Cited

U.S. PATENT DOCUMENTS

| 6,218,787 | B1  | 4/2001 | Murcko et al. |
| 7,703,951 | B2* | 4/2010 | Piepgras ................... F21K 9/00 362/373 |

(Continued)

FOREIGN PATENT DOCUMENTS

| CN | 102958250 | 3/2013 |
| CN | 106231750 | 12/2016 |

OTHER PUBLICATIONS

International Search Report dated Mar. 15, 2018 in parent PCT application PCT/CN2017/090081.

*Primary Examiner* — Haissa Philogene
(74) *Attorney, Agent, or Firm* — Andrus Intellectual Property Law

(57) ABSTRACT

A controlling system and a controlling method, the controlling system includes: a front end device, configured to generate a first data signal; an adaptor, configured to modulate a power signal according to the first data signal, and output a modulated signal, the power signal being received from the front end device and supplied to the adaptor; and, a back end device, configured to demodulate the modulated signal to obtain the power signal and generate a controlling signal in accordance with the first data signal, the power signal obtain by the back end device being supplied to the back end device, the front end device and the back end device being connected via the adaptor. Therefore, additional power supply is not needed to power up the back end device, the cost of the adaptor is lower.

15 Claims, 3 Drawing Sheets

(58) Field of Classification Search
CPC .............. H05B 45/305; H05B 45/3725; G09G 3/3406; G09G 3/3413; G02B 6/387; G02B 6/3893; G02B 6/4284
See application file for complete search history.

(56) References Cited

U.S. PATENT DOCUMENTS

| | | | |
|---|---|---|---|
| 7,800,315 B2 * | 9/2010 | Shteynberg ............ | H05B 45/20 315/291 |
| 7,824,113 B2 * | 11/2010 | Wong ...................... | G02B 6/387 385/53 |
| 8,742,680 B2 * | 6/2014 | Cowburn ............... | H05B 47/18 315/288 |
| 2013/0049633 A1 | 2/2013 | Wann et al. | |

* cited by examiner

CONTROLLING SYSTEM AND CONTROLLING METHOD

CROSS REFERENCE TO RELATED APPLICATION

The present application is the U.S. national stage application of international application PCT/CN2017/090081 filed Jun. 26, 2017, which international application was published on Jan. 3, 2019 as International Publication WO 2019/000184 A1.

TECHNICAL FIELD

Embodiments of the present disclosure generally relate to the field of communications, and more particularly, to a controlling system and a controlling method.

BACKGROUND

This section introduces aspects that may facilitate better understanding of the present disclosure. Accordingly, the statements of this section are to be read in this light and are not to be understood as admissions about what is in the prior art or what is not in the prior art.

In the field of LED (Light Emitting Diode) lighting, it is often needed to configure a LED driving current, which is used to drive LED. User usually get different driving current by various technologies, such as I-select, ready-to-mains (R2M) and DALI (Digital Addressable Lighting Interface), etc.

For the technology of I_select, different current can be obtained by external i-select resistor. For the technology of R2M, current could be set by changing the shape of mains. For the technology of DALI, current could be set according to the DALI controlling signal.

SUMMARY

In the existing LED current configuration technologies, the driver need to be powered up with high voltage. Additional mains which supply high voltage would increase cost. Besides, other additional accessory also brings high cost.

In general, embodiments of the present disclosure provide a controlling system and a controlling method. In the embodiments, a power signal received from the front end device could be modulated in accordance with a data signal received from the front end device, and a modulated signal could be generated and sent to the back end device. As a result, the back end device could obtain the data signal according to the modulated signal and could be powered up by the modulated signal. Therefore, additional power supply is not needed to power up the back end device, the cost of the controlling system is lower.

In a first aspect, there is provided a controlling system, includes:

a front end device, configured to generate a first data signal;

an adaptor, configured to modulate a power signal according to the first data signal, and output a modulated signal, wherein the power signal being received from the front end device and supplied to the adaptor; and a back end device, configured to demodulate the modulated signal to obtain the power signal and generate a controlling signal in accordance with the first data signal, the power signal obtain by the back end device being supplied to the back end device, the front end device and the back end device being connected via the adaptor.

In an embodiment, a period of the modulated signal comprises a power transmission duration and a data transmission duration, the power signal is transmitted in a lower frequency at the power transmission duration, the first data signal is transmitted in a higher frequency at the data transmission duration.

In an embodiment, the adaptor includes:

a first controller, configured to generate a power controlling signal according to the first data signal received from the front end device; and a modulator circuit, configured to modulate the power signal according to the power controlling signal, and output the modulated signal to an output terminal of the modulator circuit, and the power signal is supplied to the first controller.

In an embodiment, the modulator circuit is configured to apply the power signal or a low level signal to the output terminal according to the power controlling signal, so as to output the modulated signal to the output terminal.

In an embodiment, the modulator circuit includes:

a first switching element (Q3), configured to be turned on or off under the control of the power controlling signal; and a second switching element (Q1), configured to be turned on or off under the control of the power controlling signal;

when the first switching element is turned on, the second switching element is turned off, the power signal is applied to the output terminal, and the modulated signal turns to a high level, when the first switching element is turned off, the second switching element is turned on, the low level signal is applied to the output terminal, and the modulated signal turns to a low level.

In an embodiment, the modulator circuit further includes:

a third switching element (Q2), configured to be turned on or off under the control of an impedance controlling signal of the controller, when the third switching element is turned on, the power signal is modulated, when the third switching element is turned off, the power signal is isolated from the output terminal, and the controller receive a second data signal via the output terminal.

In an embodiment, the back end device includes:

a low-pass filter, configured to extract the power signal from the modulated signal;

a second controller, configured to extract the first data signal from the modulated signal, and generate the controlling signal, the power signal is supplied to the second controller.

In an embodiment, the controlling system is further configured that a driving current is configured depending on the controlling signal.

In an embodiment, the back end device is further configured to send a second data signal to the adaptor when stop receiving the modulated signal from the adaptor.

In a second aspect, there is provided a controlling method of a controlling system, the controlling system comprises a front end device, an adaptor and a back end device, the front end device and the back end device are connected via the adaptor, the controlling method includes:

generating a first data signal;

modulating a power signal according to the first data signal, and outputting a modulated signal, the power signal is received from the front end device and supplied to the adaptor; and demodulating the modulated signal to obtain the power signal and generate a controlling signal in accordance with the first data signal.

In an embodiment, modulating a power signal includes:

generating a power controlling signal according to the first data signal received from the front end device; and modulating the power signal according to the power controlling signal, and outputting the modulated signal to an output terminal, the power signal is received from the front end device and supplied to generate the power controlling signal.

In an embodiment, demodulating the power signal includes:

extracting the power signal from the modulated signal; and extracting the first data signal from the modulated signal, and generating the controlling signal, the power signal is supplied to extract the first data signal and generate the controlling signal.

In an embodiment, the method further includes: isolating the power signal from the output terminal, and the adaptor receiving a second data signal from the back end device.

In an embodiment, the method further includes: configuring a driving current depending on the controlling signal.

According to various embodiments of the present disclosure, a power signal received from the front end device could be modulated in accordance with a data signal received from the front end device. Therefore, additional power supply is not needed to power up the back end device, the cost of the controlling system is lower.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

First Aspect of Embodiments

A controlling system is provided in a first embodiment.

Figure 1:
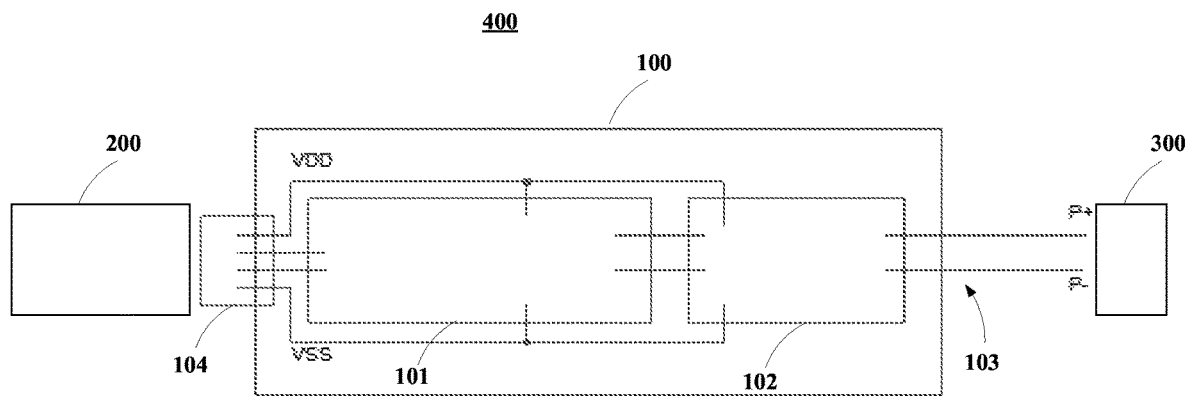
FIG. 1 is a diagram of a controlling system in accordance with an embodiment of the present disclosure.

FIG. 1 is a diagram of a controlling system in accordance with an embodiment of the present disclosure. As shown in FIG. 1, the controlling system 400 includes a front end device 200, an adaptor 100, and a back end device 300. The adaptor 100 is used for connecting the front end device 200 with the back end device 300.

In the embodiment, the front end device 200 is configured to generate a first data signal; the adaptor 100 is configured to modulate a power signal according to the first data signal, and output a modulated signal; and, the back end device 300 is configured to demodulate the modulated signal to obtain the power signal and generate a controlling signal in accordance with the first data signal.

In the embodiment, the adaptor 100 could receive the power signal from the front end device 200, and the received power signal could be supplied to the adaptor 100. That is to say, the power signal is used to power up the adaptor 100.

In the embodiment, the back end device 300 could demodulate the modulated signal to obtain the power signal, and the power signal obtained by the back end device 300 could be supplied to the back end device 300. That is to say, the power signal is used to power up the back end device 300.

In the embodiment, the power signal received from the front end device could be modulated in accordance with the first data signal received from the front end device, and the modulated signal could be generated and sent to the back end device, thus, the first data signal could be transmitted by the modulated signal. As a result, the back end device could obtain the first data signal from the modulated signal, and the back end device could be powered up by the power signal extracted from the modulated signal. Therefore, additional power supply is not needed to power up the back end device, the cost of the controlling system is lower.

In the embodiment, the front end device 200 could be a portable device, such as smart phone, portable personal computer (PC), tablets and so on, but it is not limited thereto, the front end device 200 may be other device.

In the embodiment, the front end device 200 may include a connecting interface (not shown), which could connect with the adaptor 100. The connecting interface could be, for example, USB interface. The connecting interface may include multiple pins (not shown), for example, a first pin could transmit the power signal with a voltage of VDD, a second pin could transmit a low level signal with a voltage of VSS, a third pin and a forth pin could transmit the first data signal. It is noted that, the embodiment is not limited thereto, the connecting interface may have other structure.

In the embodiment, the back end device 300 could be a lighting driver, which could generate a driving signal for driving a lighting element, the lighting element could be, for example, LED (light emitting diode), but it is not limited thereto, the back end device may be other device. The back end device 300 may include a connecting interface (not shown), which could connect with the adaptor 100.

In an embodiment, the controlling system 400 could be used to configure a driving current for LED. For example, the front end device 200 is a smart phone, the back end device 300 is part of a LED driver; the smart phone could be installed with an application (APP), ant the smart phone could generate a current configuration signal as the first data signal under the operation of a user, the adaptor 100 receives the current configuration signal and the power signal from the front end device 200, and outputs the modulated signal to the LED driver; the LED driver could demodulate the modulated signal to obtain the power signal and the current configuration signal; the LED driver uses the power signal as power supply to power up the LED driver, and generates a driving current according to the current configuration signal. It is noted that, the embodiment is not limited thereto, other system may be formed.

In the embodiment, both power signal and the first data signal could be transmitted by the modulated signal outputted from the adaptor 100.

Figure 2:
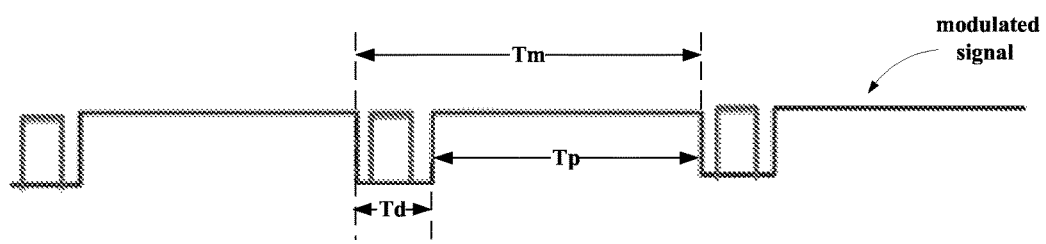
FIG. 2 is a diagram of the modulated signal in accordance with an embodiment of the present disclosure.

FIG. 2 is a diagram of the modulated signal in accordance with an embodiment of the present disclosure.

As shown in FIG. 2, a period Tm of the modulated signal could include a power transmission duration Tp and a data transmission duration Td.

In the embodiment, as shown in FIG. 2, the power signal could be transmitted in a lower frequency at the power transmission duration Tp, and the first data signal could be transmitted in a higher frequency at the data transmission duration Td.

Therefore, the back end device 300 could obtain the power signal by extracting the lower frequency part of the modulated signal, and obtain the first data signal by extracting the higher frequency part of the modulated signal.

It should be noted that, the structure of the modulated signal is not limited to FIG. 2, the modulated signal could have other structure.

The structures of the adaptor 100 and the back end device 300 will be described below.

As shown in FIG. 1, the adaptor 100 could include a first controller 101 and a modulator circuit 102.

In an embodiment, the first controller 101 is configured to generate a power controlling signal according to the first data signal received from the front end device 200; and, the modulator circuit 102 is configured to modulate the power signal according to the power controlling signal, and output the modulated signal to an output terminal 103 of the modulator circuit 102.

In the embodiment, the power signal could be received from the front end device 200 and supplied to the first controller 101. That is to say, the power signal is used to power up the first controller 101.

In the embodiment, the output terminal 103 of the adaptor could connect with the connecting interface of the backend device 300. As shown in FIG. 1, the output terminal 103 may include 2 pins, one is first pin P+ and the other is second pin P−.

In the embodiment, the output terminal 103 may include 2 pins, one is first pin P+ and the other is second pin P−. But the embodiment is not limited thereto, the output terminal 103 may have other structure.

In the embodiment, as shown in FIG. 1, the adaptor 100 could further include a connector 104. The connector 104 could be configured to connect with the front end device 200, so as to receive the power signal, the low level signal and the first data signal from the front end device 200. For example, the connector 104 could connect with the connecting interface of the front end device 200.

In the embodiment, the modulated circuit 102 could be configured to apply the power signal or a low level signal to the output terminal 103 according to the power controlling signal, so as to output the modulated signal to the output terminal 103. For example, the modulated signal could be applied to the first pin P+ of the output terminal 103

In the embodiment, the modulated circuit 102 could be configured to apply the power signal or a low level signal to the output terminal 103 according to the power controlling signal, so as to output the modulated signal to the output terminal 103. For example, the modulated signal could be applied to the first pin P+ of the output terminal 103.

Figure 3:
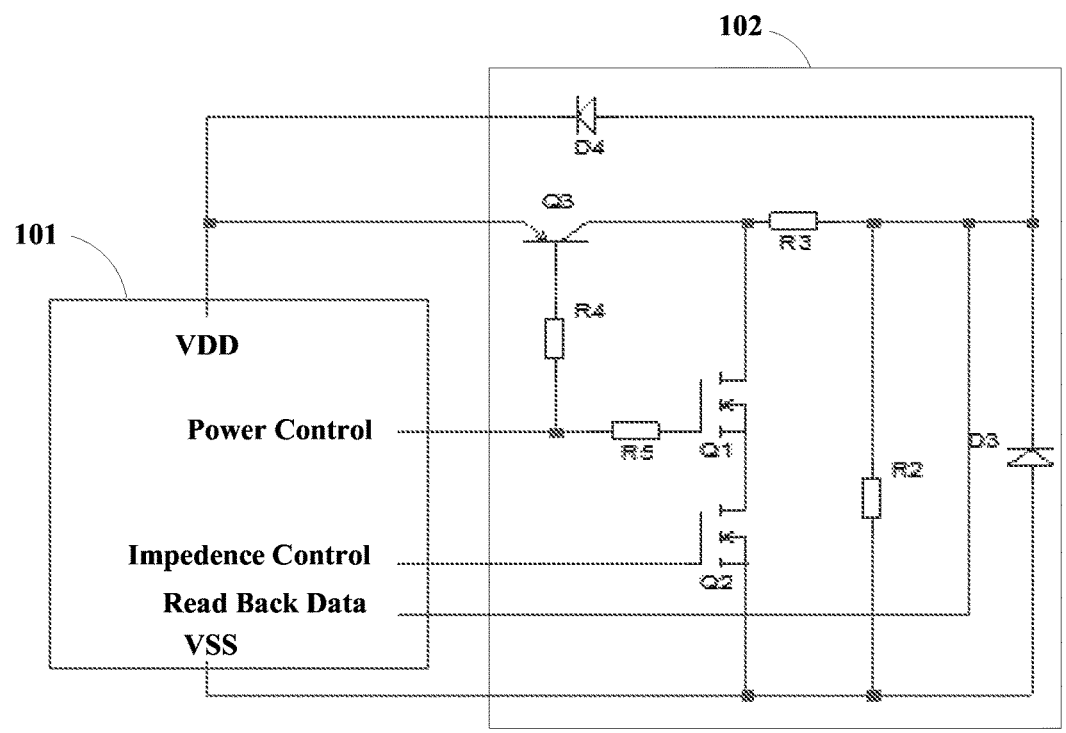
FIG. 3 is a diagram of the modulated circuit in accordance with an embodiment of the present disclosure.

FIG. 3 is a diagram of the modulated circuit in accordance with an embodiment of the present disclosure. As shown in FIG. 3, the modulator circuit 102 includes a first switching element Q3 and a second switching element Q1.

In the embodiment, the first switching element Q3 could be turned on or off under the control of the power controlling signal; and the second switching element Q1 could be turned on or off under the control of the power controlling signal.

In the embodiment, when the first switching element Q3 is turned on, the second switching element Q1 is turned off, the power signal is applied to the output terminal, and the modulated signal turns to a high level.

In the embodiment, when the first switching element Q3 is turned off, the second switching element Q1 is turned on, the low level signal is applied to the output terminal, and the modulated signal turns to a low level.

In the embodiment, the modulator circuit 102 could further include a third switching element Q2, the third switching element Q2 could be turned on or off under the control of an impedance controlling signal of the first controller 101.

In the embodiment, when the third switching element Q2 is turned on, the power signal is modulated, and the modulated signal is applied to the first pin P+; when the third switching element Q2 is turned off, the power signal is isolated from the output terminal 103, and the first controller 101 could receive a second data signal via the output terminal 103.

As shown in FIG. 3, the first switching element Q3 could be a PNP bipolar transistor, the second switching element Q1 could be an N-MOS transistor, the third switching element Q2 could be an N-MOS transistor.

In the embodiment, the base of the first switching element Q3 connects a power control pin of the first controller 101, receiving the power controlling signal. The emitter of the first switching element Q3 connects a VDD pin of the first controller 101. The VDD pin of the first controller 101 could be applied with the power signal. The collector of the first switching element Q3 connects the first pin P+ of the output terminal 103. Therefore, the first pin P+ and the VDD pin of the first controller 101 could be connected by the first switching element Q3.

In the embodiment, the second switching element Q1 and the third switching element Q2 connects in serial between the first pin P+ and the second pin P−. The gate of the second switching element Q1 connects to the power control pin of the first controller 101. The gate of the third switching element Q2 connects to an impedance control pin of the first controller 101, receiving the impedance controlling signal.

In the embodiment, the drain of the second switching element Q1 connects to the collector of Q3, the source of Q2 connects to the second pin P−. The second pin P− could connect to a VSS pin of the first controller 101. The VSS pin of the first controller 101 could be applied with the low level signal.

In the embodiment, a readback data pin of the first controller 101 could connect to the first pin P+. Therefore, when the third switching element Q2 is turned off, the readback data pin of the first controller 101 could receive the second data signal via the output terminal. The first controller 101 could determine whether the back end device 300 is properly controlled, and then modulate the power signal in consideration of the determination result.

As shown in FIG. 3, the modulator circuit 102 further includes a first diode D3 and a second diode D4. The first diode D3 could be set between the first pin and the second pin, and the second diode D4 could be set between the first pin and the VDD pin of the first controller 101. Therefore, the first diode D3 and the second diode D4 could provide protection to the modulator circuit 102 and the back end device 300.

As shown in FIG. 3, the modulator circuit 102 further includes resistor R2, R3, R4, and R5.

The working principle of the modulator circuit 102 is as follows, where "1" refers to high level and "0" refers to low level.

When the impedance controlling signal output from the impedance control pin of the control is "1", Q2 is turned on, the adaptor 100 turns into "write mode". Under "write mode", when the power controlling signal output from the power control pin is "0", Q3 is turned on and Q1 is turned off, thus the first pin P+ connects with the VDD pin, and voltage of the first pin P+ is "1"; when the power controlling signal output from the power control pin is "1", Q3 is turned off and Q1 is turned on, thus the first pin P+ connects with the VSS pin, and voltage of the first pin P+ is "0".

When the impedance controlling signal output from the impedance control pin of the control is "0", Q2 is turned off, the power controlling signal output from the power control pin is "1", Q3 is turned off and Q1 is turned on, the adaptor 100 turns into "read mode". Under "read mode", there is a high resistance state between P+ and P−, and the readback data pin of the first controller 101 could connect to the first pin P+. Thus, the readback data pin of the first controller 101 could read the second data signal via the output terminal. Therefore, the second data signal of the back end device 300 could feedback to the adaptor 100.

It should be noted that, FIG. 3 is an example of the modulator circuit, the disclosure is not limited thereto, and the modulator circuit may have other structure.

Figure 4:
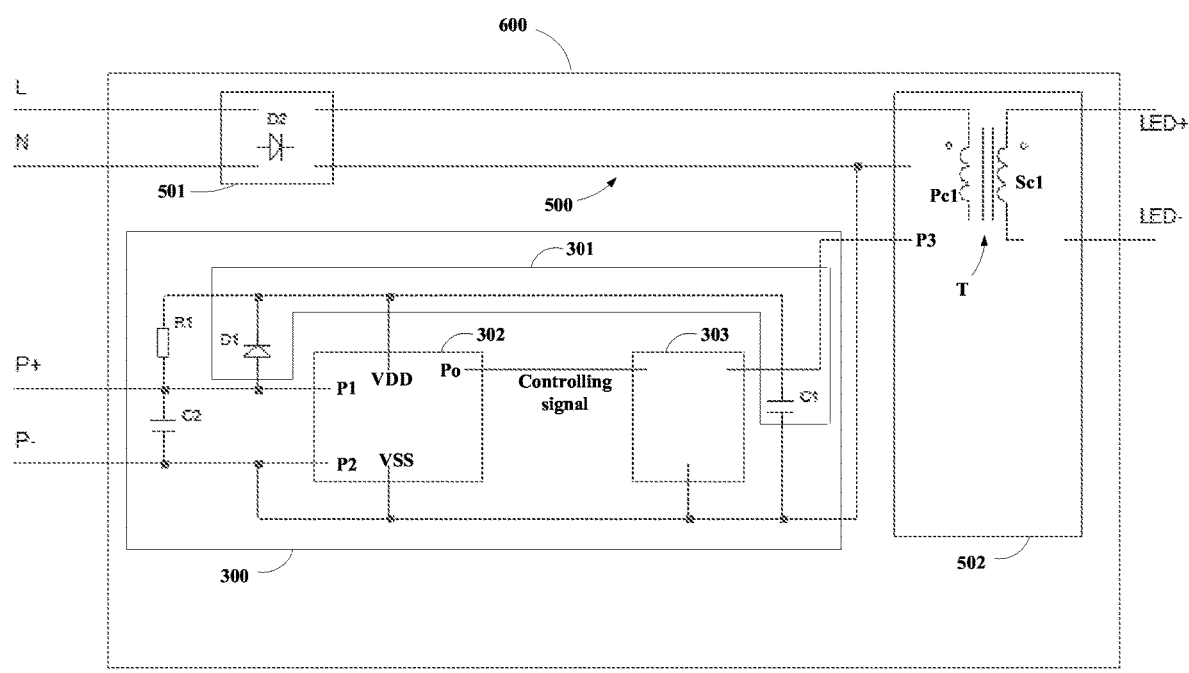
FIG. 4 is a diagram of the back end device in accordance with an embodiment of the present disclosure.

FIG. 4 is a diagram of the back end device in accordance with an embodiment of the present disclosure. As shown in FIG. 4, the back end device 300 includes a low-pass filter 301 and a second controller 302.

In the embodiment, the low-pass filter 301 is configured to extract the power signal from the modulated signal; the second controller 302 is configured to extract the first data signal from the modulated signal, and generate the controlling signal.

In the embodiment, the power signal extracted by the low-pass filter could be supplied to the second controller 302. That is to say, the second controller 302 is powered up by the power signal.

A shown in FIG. 4, the low-pass filter 301 could include a third diode D1 and a first capacitor C1. The third diode D1 connects between a first input pin P1 of the second controller 302 and a VDD pin of the second controller 302. The first capacitor C1 connects between the VDD pin of the second controller 302 and a VSS pin of the second controller 302. The VSS pin of the second controller 302 connects a second input pin P2 of the second controller 302. The first input pin P1 and the second input pin P2 connects pin P+ and pin P−, respectively.

As shown in FIG. 4, the low-pass filter 301 could filter the modulated signal received from the pin P+ and pin P−, to extract the lower frequency part of the modulated signal, so as to obtain the power signal from the modulated signal. The power signal obtained from the modulated signal is applied to the VDD pin of the second controller, to power the second controller up.

As shown in FIG. 4, the modulated signal outputted from pin P+ and P− could be inputted into the second controller 302 from the first input pin P1 and the second pin P2. The second controller 302 could decode the higher frequency part of the modulated signal to extract the first data signal from the modulated signal, and generate the controlling signal according to the first data signal. The controlling signal generated in the second controller could be outputted from an output pin Po of the second controller 302.

The controlling signal could be outputted to a driving circuit 500, so that the driving circuit 500 could output a driving current in accordance with the controlling signal. In an embodiment, the driving circuit 500 could be LED driving circuit, for example, as shown in FIG. 4, the LED driving circuit could include a rectifier 501 and a convertor 502.

The rectifier 501 could include diode bridge D2, and the rectifier 501 could be inputted AC (Alternating Current) signal from N line and L line. The output signal of the rectifier 501 could be inputted to the convertor 502. The convertor 502 could include a transformer T, the transformer could transform the signal from the rectifier 501 to a driving current in accordance with the controlling signal inputted from an input pin P3 of the convertor 502. The convertor 502 may be formed by a flyback converter or resonant halfbridge converter or LLC converter comprising the transformer T. Instead of the transformer T there might from an inductor a part of a switched converter e.g. a buck converter or boost converter which forms the convertor 502. The clocking of the convertor 502 and especially the transformer T by at least one controllable switch which is clocked at high frequency may depend on the controlling signal inputted from an input pin P3 of the convertor 502. For instance the frequency and/or the duty cycle of the controllable switch of the convertor 502 may be adjusted in dependency on the controlling signal inputted from the input pin P3 of the convertor 502.

As shown in FIG. 4, a primary coil Pc1 of the transformer in the convertor 502 could receive the signal from the rectifier 501, and a secondary coil Sc1 of the transformer output the driving current. The driving current could be sent to LED element by cables LED+ and LED−. The driving device 600 with the convertor 502 generates a driving current for the LED element according to the controlling signal inputted from the input pin P3.

As shown in FIG. 4, the VSS pin of the second controller 302 could connect with line N.

As shown in FIG. 4, the back end device 300 could further include a third controller 303, which could be inputted the controlling signal and perform process on the controlling signal to output a processed controlling signal to the input pin P3 of the convertor 502. However, when the convertor 502 is a pure digital convertor, the third controller 303 could be not necessary, and the controlling signal outputted from the second controller 302 could be directly outputted to the input pin P3 of the convertor 502.

In the embodiment, the backend device 300 and the driving circuit 500 could be regard as a driving device 600.

In an embodiment, the back end device 300 could be further configured to send a second data signal to the adaptor 100 when the back end device 300 stops receiving the modulated signal from the adaptor 100. Therefore, the second data signal of the back end device 300 could be feedback to the adaptor 100.

As shown in FIG. 4, the back end device 300 could further include a resistor R1, which could connect parallel with diode D1. The resistor R1 is optional when the controlling system 400 enters into a predetermined controlling mode. For example, the predetermined controlling mode could be a controlling mode in accordance with a current configuration technology of I-select 2.

As shown in FIG. 4, the back end device 300 could further include a capacitor C2, which could connect between the first input pin P1 and the second pin P2 of the second controller 302.

As can be seen from the above embodiments, the power signal received from the front end device could be modulated in accordance with the data signal received from the front end device, and the modulated signal could be generated and sent to the back end device. As a result, the back end device could obtain the data signal according to the modulated signal and could be powered up by the modulated signal. Therefore, additional power supply is not needed to power up the back end device, the cost of the adaptor is lower. Besides, the adaptor could also read data signal from the back end device.

Second Aspect of Embodiments

A controlling method of a controlling system is provided in an embodiment. The controlling system comprises a front end device, an adaptor and a back end device, the front end device and the back end device are connected via the adaptor. The same contents as those in the first aspect of embodiments are omitted.

Figure 5:
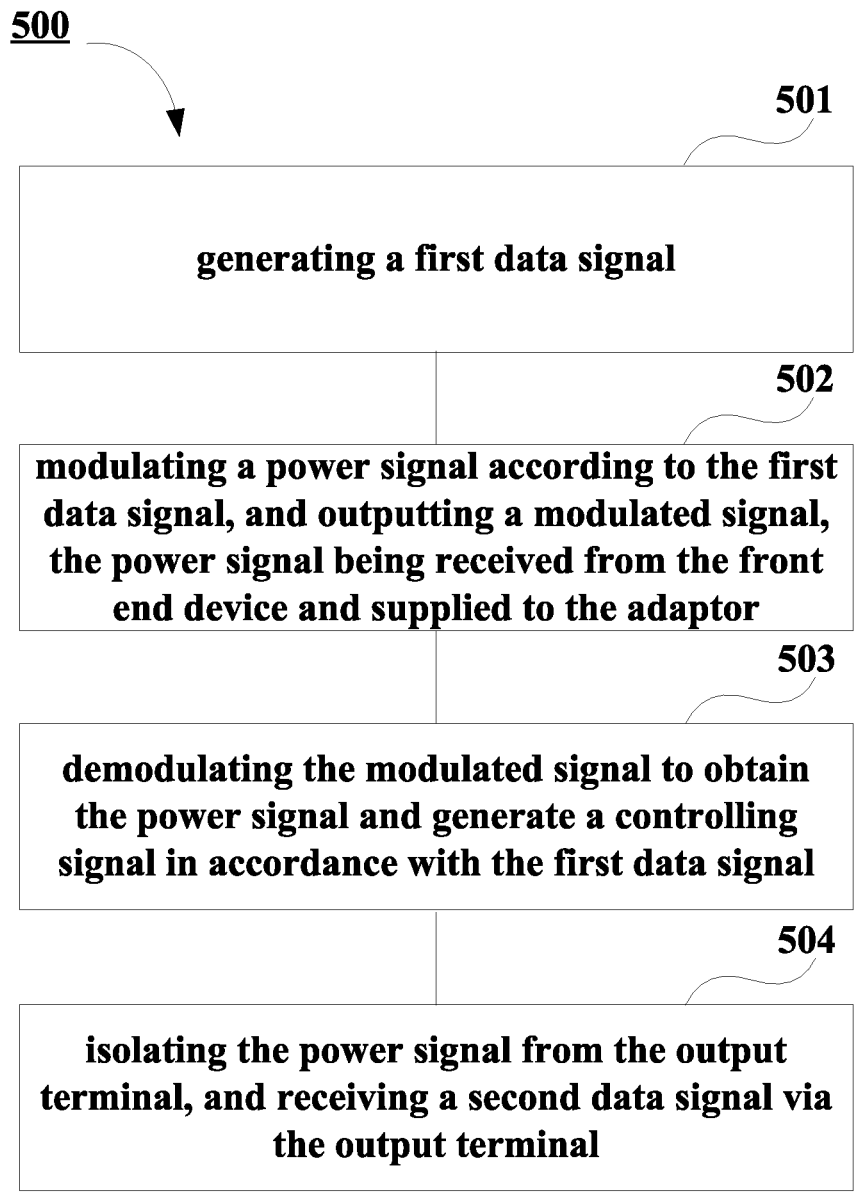
FIG. 5 shows a flowchart of a controlling method 500 of the controlling method.

FIG. 5 shows a flowchart of a controlling method 500 of the controlling system.

As shown in FIG. 5, the method 500 includes:

generating a first data signal at block 501; modulating a power signal according to the first data signal, and outputting a modulated signal, the power signal being received from the front end device and supplied to the adaptor at block 502; and, demodulating the modulated signal to obtain the power signal and generate a controlling signal in accordance with the first data signal at block 503.

In an embodiment, block 502 includes: generating a power controlling signal according to the first data signal received from the front end device; and, modulating the power signal according to the power controlling signal, and outputting the modulated signal to an output terminal.

In the embodiment, in block 502, the power signal could be received from the front end device and supplied to generate the power controlling signal.

In an embodiment, block 503 includes: extracting the power signal from the modulated signal; and extracting the first data signal from the modulated signal, and generating the controlling signal.

In the embodiment, in block 503, the power signal could be supplied to extract the first data signal and generate the controlling signal.

In an embodiment, the method 500 further includes: isolating the power signal from the output terminal, and receiving a second data signal via the output terminal at block 504.

In an embodiment, the method 500 further includes: configuring a driving current depending on the controlling signal (not shown in FIG. 5).

As can be seen from the above embodiments, the power signal received from the front end device could be modulated in accordance with the data signal received from the front end device, and the modulated signal could be generated and sent to the back end device. As a result, the back end device could obtain the data signal according to the modulated signal and could be powered up by the modulated signal. Therefore, additional power supply is not needed to power up the back end device, the cost of the adaptor is lower. Besides, the adaptor could also read data signal from the back end device.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A controlling system, comprising:
   a front end device, configured to generate a first data signal;
   an adaptor, configured to modulate a power signal according to the first data signal, and output a modulated signal, wherein the power signal is received from the front end device and supplied to the adaptor; and
   a back end device, configured to demodulate the modulated signal to obtain the power signal and generate a controlling signal in accordance with the first data signal, wherein, the power signal obtained by the back end device is supplied to the back end device, wherein, the front end device and the back end device are connected via the adaptor.

2. The controlling system according to claim 1, wherein, a period of the modulated signal comprises a power transmission duration and a data transmission duration, wherein, the power signal is transmitted in a lower frequency at the power transmission duration, the first data signal is transmitted in a higher frequency at the data transmission duration.

3. The controlling system according to claim 2, wherein, the adaptor comprises:
   a first controller, configured to generate a power controlling signal according to the first data signal received from the front end device; and
   a modulator circuit, configured to modulate the power signal according to the power controlling signal, and output the modulated signal to an output terminal of the modulator circuit,
   wherein, the power signal is supplied to the first controller.

4. The controlling system according to claim 3, wherein, the modulator circuit is configured to apply the power signal or a low level signal to the output terminal according to the power controlling signal, so as to output the modulated signal to the output terminal.

5. The controlling system according to claim 4, wherein, the modulator circuit comprises:
   a first switching element (Q3), configured to be turned on or off under the control of the power controlling signal; and
   a second switching element (Q1), configured to be turned on or off under the control of the power controlling signal;
   wherein, when the first switching element is turned on, the second switching element is turned off, the power signal is applied to the output terminal, and the modulated signal turns to a high level,
   when the first switching element is turned off, the second switching element is turned on, the low level signal is applied to the output terminal, and the modulated signal turns to a low level.

6. The controlling system according to claim 5, wherein, the modulator circuit further comprises:
   a third switching element (Q2), configured to be turned on or off under the control of an impedance controlling signal of the controller,
   wherein, when the third switching element is turned on, the power signal is modulated,
   when the third switching element is turned off, the power signal is isolated from the output terminal, and the controller receive a second data signal via the output terminal.

7. The controlling system according to claim 2, wherein, the back end device comprises:
   a low-pass filter, configured to extract the power signal from the modulated signal;
   a second controller, configured to extract the first data signal from the modulated signal, and generate the controlling signal,
   wherein, the power signal is supplied to the second controller.

8. The controlling system according to claim 2, wherein, the back end device is further configured to send a second data signal to the adaptor when stop receiving the modulated signal from the adaptor.

9. The controlling system according to claim 1, wherein, a driving current is configured depending on the controlling signal.

10. A controlling method of a controlling system, which comprises a front end device, an adaptor and a back end device, wherein the front end device and the back end device are connected via the adaptor, the controlling method comprising:

generating a first data signal;

modulating a power signal according to the first data signal, and outputting a modulated signal, wherein the power signal is received from the front end device and supplied to the adaptor; and demodulating the modulated signal to obtain the power signal and generate a controlling signal in accordance with the first data signal.

11. The controlling method according to claim 10, wherein, modulating a power signal comprises:

generating a power controlling signal according to the first data signal received from the front end device; and modulating the power signal according to the power controlling signal, and outputting the modulated signal to an output terminal, wherein the power signal being received from the front end device and supplied to generate the power controlling signal.

12. The controlling method according to claim 10, wherein, demodulating the power signal comprises:

extracting the power signal from the modulated signal; and extracting the first data signal from the modulated signal, and generating the controlling signal, wherein the power signal being supplied to extract the first data signal and generate the controlling signal.

13. The controlling method according to claim 10, wherein, the method further comprises:

isolating the power signal from the output terminal, and the adaptor receiving a second data signal from the back end device.

14. The controlling method according to claim 10, the method further comprises:

configuring a driving current depending on the controlling signal.

15. The controlling method of claim 10 wherein the controlling system further comprises a computer program product being tangibly stored on a computer readable storage medium and including instructions which, when executed on a processor in the system, cause the system to perform the controlling method.

* * * * *